(12) United States Patent
Waldner et al.

(10) Patent No.: US 8,657,324 B2
(45) Date of Patent: Feb. 25, 2014

(54) TRACTOR-TRAILER HOSE SUPPORT

(75) Inventors: Jonathan S. Waldner, Park Rapids, MN (US); Christopher William Herren, Crooks, SD (US)

(73) Assignee: James Hofer, Mitchell, SD (US)

( * ) Notice: Subject to any disclaimer, the term of this patent is extended or adjusted under 35 U.S.C. 154(b) by 0 days.

(21) Appl. No.: 13/482,462

(22) Filed: May 29, 2012

(65) Prior Publication Data

US 2013/0320156 A1 Dec. 5, 2013

(51) Int. Cl.
*B62D 53/06* (2006.01)

(52) U.S. Cl.
USPC ......... 280/423.1; 280/420; 280/421; 280/422

(58) Field of Classification Search
USPC ............. 248/80, 75, 81, 82, 283.1, 296.1, 91, 248/289.11, 521, 51, 58, 68.1, 89, 62, 74.1, 248/74.3; 211/171, 96, 100, 113, 116; 280/420, 421, 422; 137/899.1, 355.17
See application file for complete search history.

(56) References Cited

U.S. PATENT DOCUMENTS

| | | | | |
|---|---|---|---|---|
| 679,794 A * | 8/1901 | Sweet | | 211/19 |
| 716,214 A * | 12/1902 | Gagnon | | 248/290.1 |
| 782,617 A * | 2/1905 | Mellinger | | 248/91 |
| 899,465 A * | 9/1908 | Nuhring | | 248/91 |
| 1,435,110 A * | 11/1922 | Efford | | 211/96 |
| 1,525,533 A * | 2/1925 | Brown | | 211/96 |
| 1,843,207 A * | 2/1932 | Collier | | 211/96 |
| 1,896,746 A * | 2/1933 | Henry | | 403/52 |
| 2,095,185 A * | 10/1937 | Fish | | 248/51 |
| 2,222,831 A * | 11/1940 | Bitney | | 248/91 |
| 2,931,513 A * | 4/1960 | Cignoli | | 211/35 |
| 3,650,545 A * | 3/1972 | Freed | | 280/421 |
| 3,724,677 A * | 4/1973 | Vogelhuber et al. | | 211/96 |
| 4,002,357 A * | 1/1977 | Bennett | | 285/61 |
| 4,185,801 A * | 1/1980 | Plymoth | | 248/282.1 |
| 4,465,253 A * | 8/1984 | Lang et al. | | 248/75 |
| 4,541,327 A * | 9/1985 | Lundstrom | | 454/63 |
| 5,181,294 A * | 1/1993 | Campbell et al. | | 15/315 |
| D343,320 S * | 1/1994 | Smith | | D6/552 |
| 5,560,583 A * | 10/1996 | Holmgren | | 248/652 |
| 5,713,592 A | 2/1998 | Dunell | | |
| 6,651,940 B2 * | 11/2003 | Hill, Sr. | | 248/80 |
| 2006/0289580 A1 * | 12/2006 | Faver et al. | | 224/521 |
| 2011/0108590 A1 * | 5/2011 | Kennedy et al. | | 224/402 |

* cited by examiner

*Primary Examiner* — Nkeisha Smith
(74) *Attorney, Agent, or Firm* — Dennis L. Thomte; Thomte Patent Law Office LLC

(57) ABSTRACT

A hose support for supporting hoses which extend between the tractor and the trailer of a tractor-trailer rig with the tractor having a headache rack, with forward and rearward sides, positioned rearwardly of the cab of the tractor. A substantially vertically disposed mounting plate is secured to the rearward side of the headache rack and has an elongated hose support arm, having forward and rearward ends, with the rearward end of the hose support arm being pivotally secured, about a vertical axis to the mounting plate. The hose support arm may extend rearwardly and upwardly from the mounting plate or extend rearwardly and downwardly from the mounting plate. The rearward end of the hose support arm is adapted to have the hoses secured thereto.

13 Claims, 4 Drawing Sheets

TRACTOR-TRAILER HOSE SUPPORT

BACKGROUND OF THE INVENTION

1. Field of the Invention

This invention relates to a hose support for supporting one or more flexible hoses extending between a tractor and trailer of a tractor-trailer rig. The hose support may also support electrical cables or the like.

2. Description of the Related Art

In conventional tractor-trailer type rigs, air hoses and/or electrical cables extend rearwardly from the tractor which are adapted to be releasably coupled with a trailer for operating and controlling components on the trailer such as brakes, lights, etc. In the past, the normal practice was to secure a spring member to the tractor for connection to the hoses and cables to hold the same in a suspended or retracted condition against the rear portion of the tractor cab to prevent damage to the lines. If the hoses are not adequately supported, when the tractor is turned with respect to the trailer, the hoses may be subjected to wear due to the engagement of the hoses with portions of the tractor or trailer. Further, if the hoses are not adequately supported, the hoses could break or be disconnected when the tractor is turned with respect to the trailer.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In the drawings, the tractor of the tractor-trailer rig is shown to have a headache rack which is positioned at the rearward side of the cab of the tractor. A substantially vertically disposed mounting plate is secured to the rearward side of the headache rack. An elongated hose support arm is provided which has forward and rearward ends. The forward end of the hose support arm is pivotally secured, about a vertical axis, to the mounting plate. In the preferred embodiment, the hose support arm extends upwardly and rearwardly from its pivotal connection with the mounting plate. In another embodiment, the hose support arm extends rearwardly and downwardly from the mounting plate.

The mounting plate may be secured to various portions of the headache rack. If the tractor does not have a headache rack, the mounting plate may be secured to the rearward side of the cab of the tractor.

It is therefore a principal object of the invention to provide an improved support for supporting the hoses and cables which extend between a tractor and trailer of a tractor-trailer rig.

A further object of the invention is to provide a hose support which may also be used to support electrical cables as well as air hoses.

A further object of the invention is to provide a hose support of the type described which includes a mounting plate secured to the headache rack of the tractor and which includes an elongated hose support arm which extends upwardly and rearwardly from the mounting plate with the support arm being pivotally secured to the mounting plate about a vertical axis.

A further object of the invention is to provide a hose support of the type described which prevents damage to the hoses and cables which extend between the tractor and the trailer of a tractor-trailer rig.

A further object of the invention is to provide a hose support which is easily installed on either the rearward side of the cab of a tractor of a tractor-trailer rig or which may be secured in various positions on the rearward side of a headache rack positioned rearwardly of the rearward side of the cab of the tractor.

A further object of the invention is to provide a hose support which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
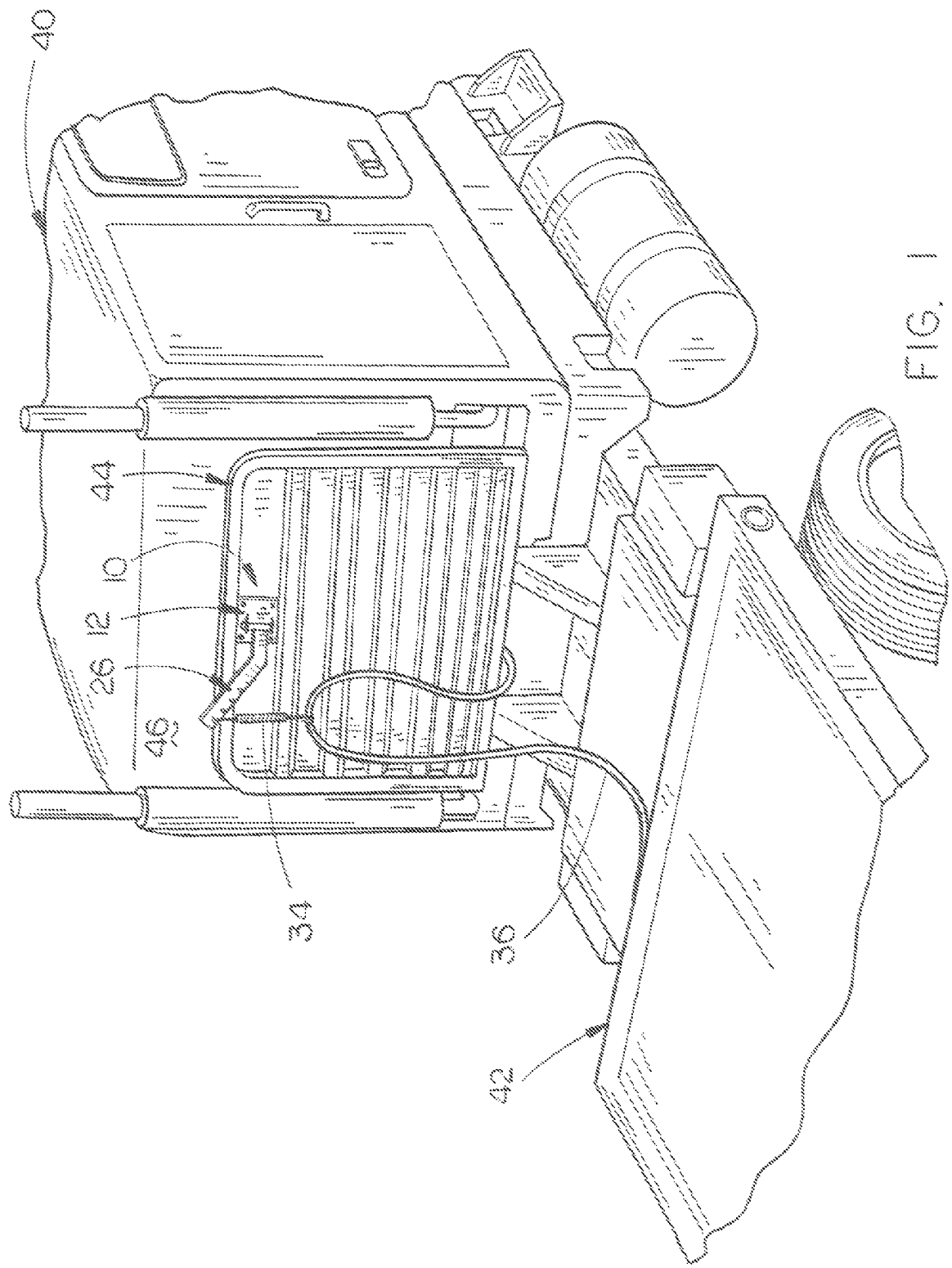
FIG. 1 is a partial rear perspective view of a tractor and trailer rig wherein the hose support of this invention is secured to the headache rack which is positioned rearwardly of the cab of the tractor.
Figure 2:
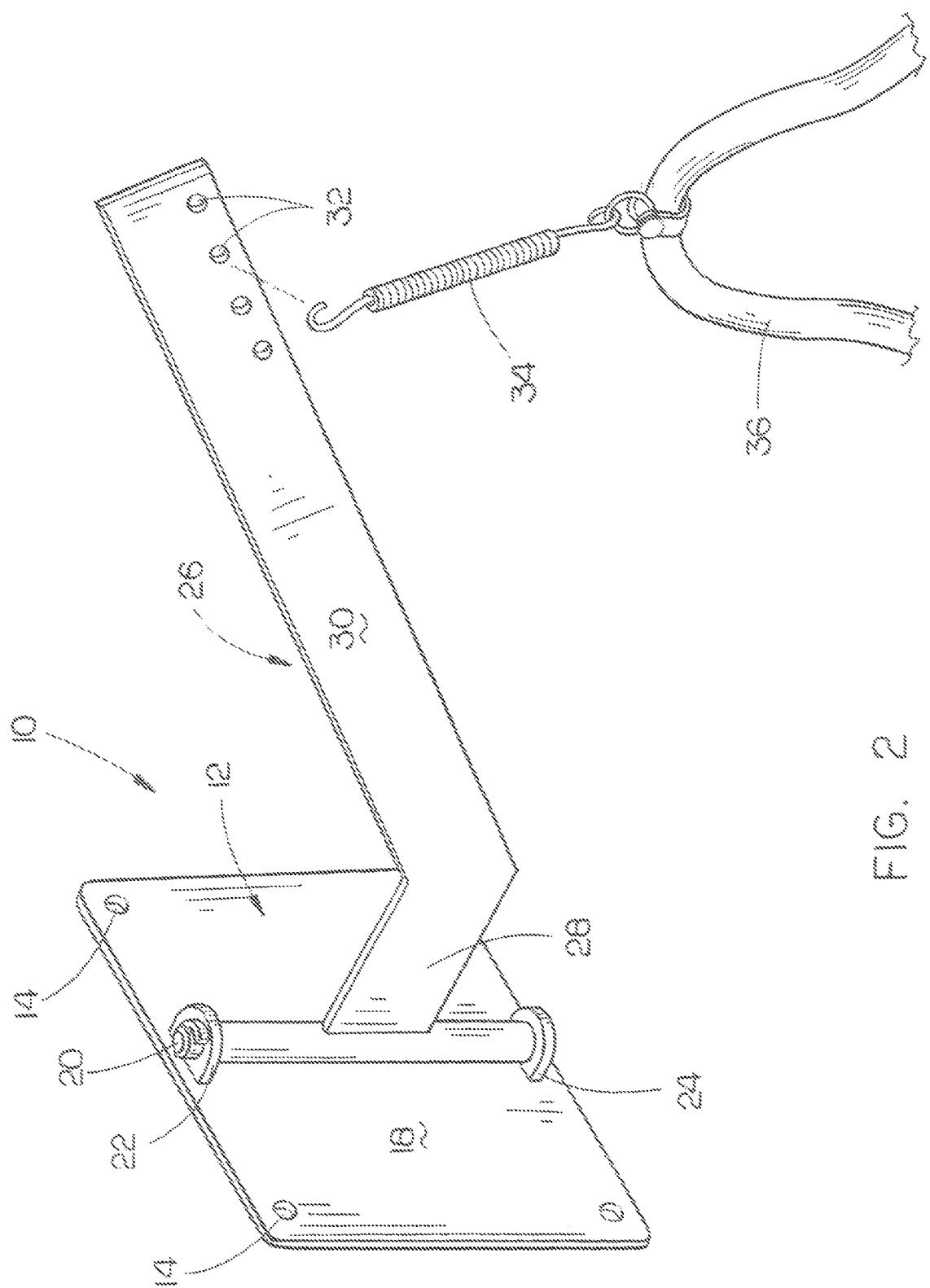
FIG. 2 is a perspective view of the hose support of this invention.
Figure 3:
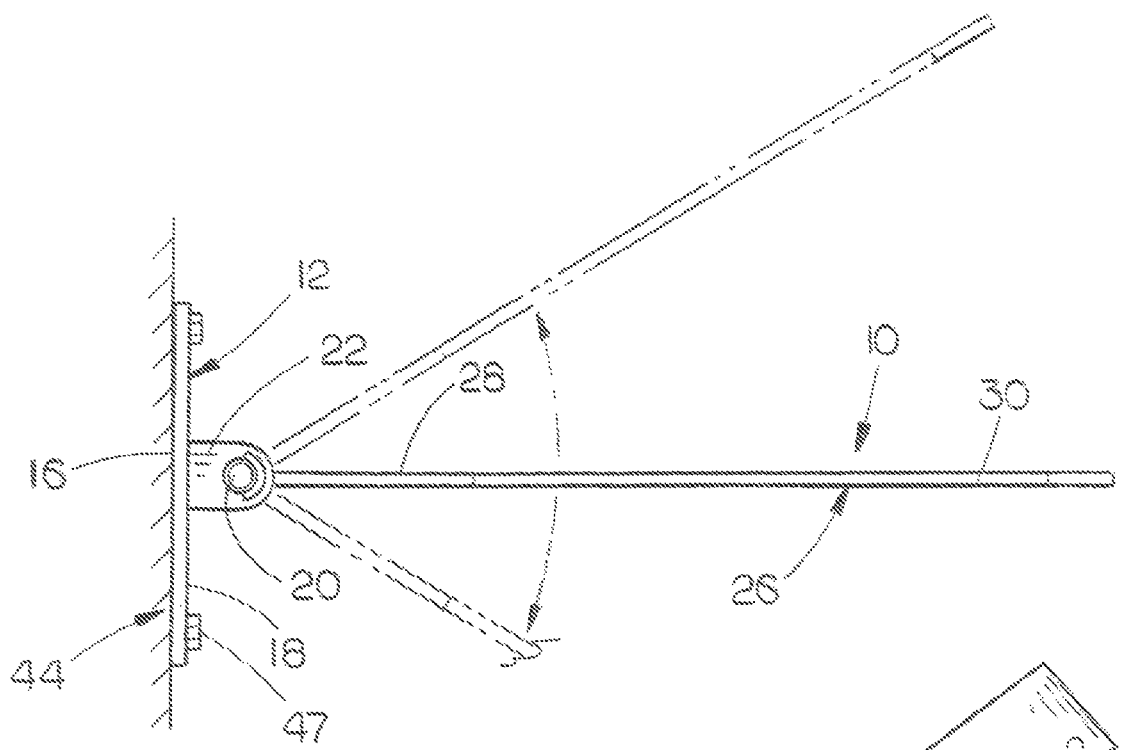
FIG. 3 is a top elevational view of the hose support of this invention secured to the headache rack with broken lines illustrating the manner in which the support arm of the hose support may pivotally move about a vertical axis.
Figure 4:
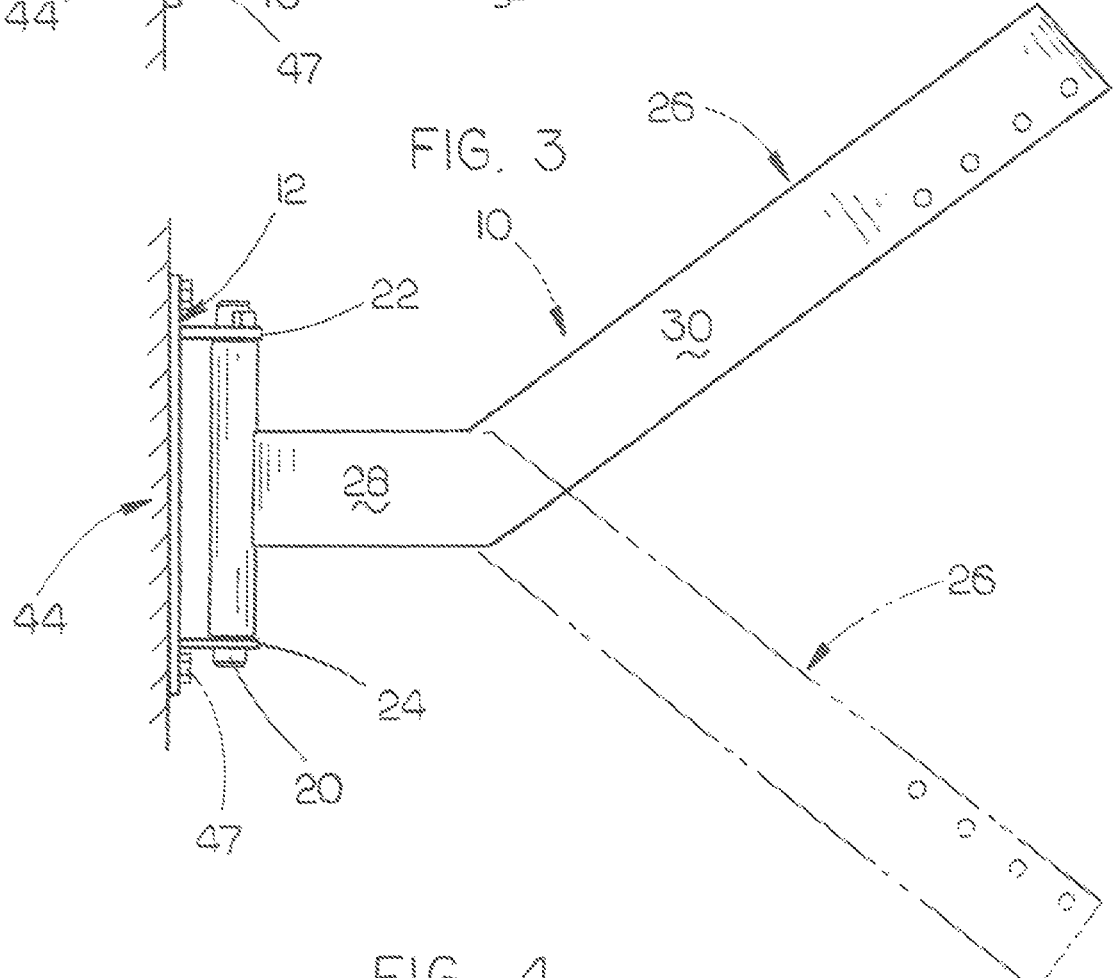
FIG. 4 is a side elevational view of the hose support secured to the headache rack of the tractor with the broken lines illustrating the alternate position of the support arm.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The hose support of this invention is referred to generally by the reference numeral 10. Support 10 includes a flat mounting plate 12 having a plurality of screw or bolt openings 14 formed therein. Plate 12 has a forward side 16 and a rearward side 18. A pivot pin 20 is pivotally secured to ears or brackets 22 and 24 which extend rearwardly from the rearward side 18 of plate 12.

The numeral 26 refers to a support arm which includes a forward end portion 28 and a rearward end portion 30. The forward end of forward end portion 28 is welded to pivot pin 20 for pivotal movement therewith. As seen, rearward end portion 30 extends from forward end portion 28 at an angle thereto. The rearward end of rearward end portion 30 has a plurality of spaced-apart adjustment openings 32 formed therein.

The numeral 34 refers to an elongated spring which will normally be used in conjunction with the support 10. In that case, the upper end of the spring 34 will be secured to one of the adjustment openings 32. The lower end of the spring 34 will be secured to the hoses and/or cables 36 which extend between the tractor 40 and the trailer 42 to support the same.

In many cases, a headache rack 44 is secured to the frame of the tractor 40 rearwardly of the cab 46 of the tractor 40. If a headache rack 44 is present, the mounting plate 12 will be screwed or bolted to the headache rack 44 by screws 47, at the center of the headache rack at any place between the upper and lower ends thereof. If the mounting plate 12 is secured to the upper part of the headache rack 44, the mounting plate 12 may be secured to the headache rack 44 so that the support arm 26 extends horizontally rearwardly and then upwardly and rearwardly or so that the support extends rearwardly and then downwardly and rearwardly. If the mounting plate 12 is secured to the lower end of the headache rack 44, the mounting plate 12 will be secured thereto so that the support arm extends rearwardly and upwardly from the headache rack 44.

Figure 5:
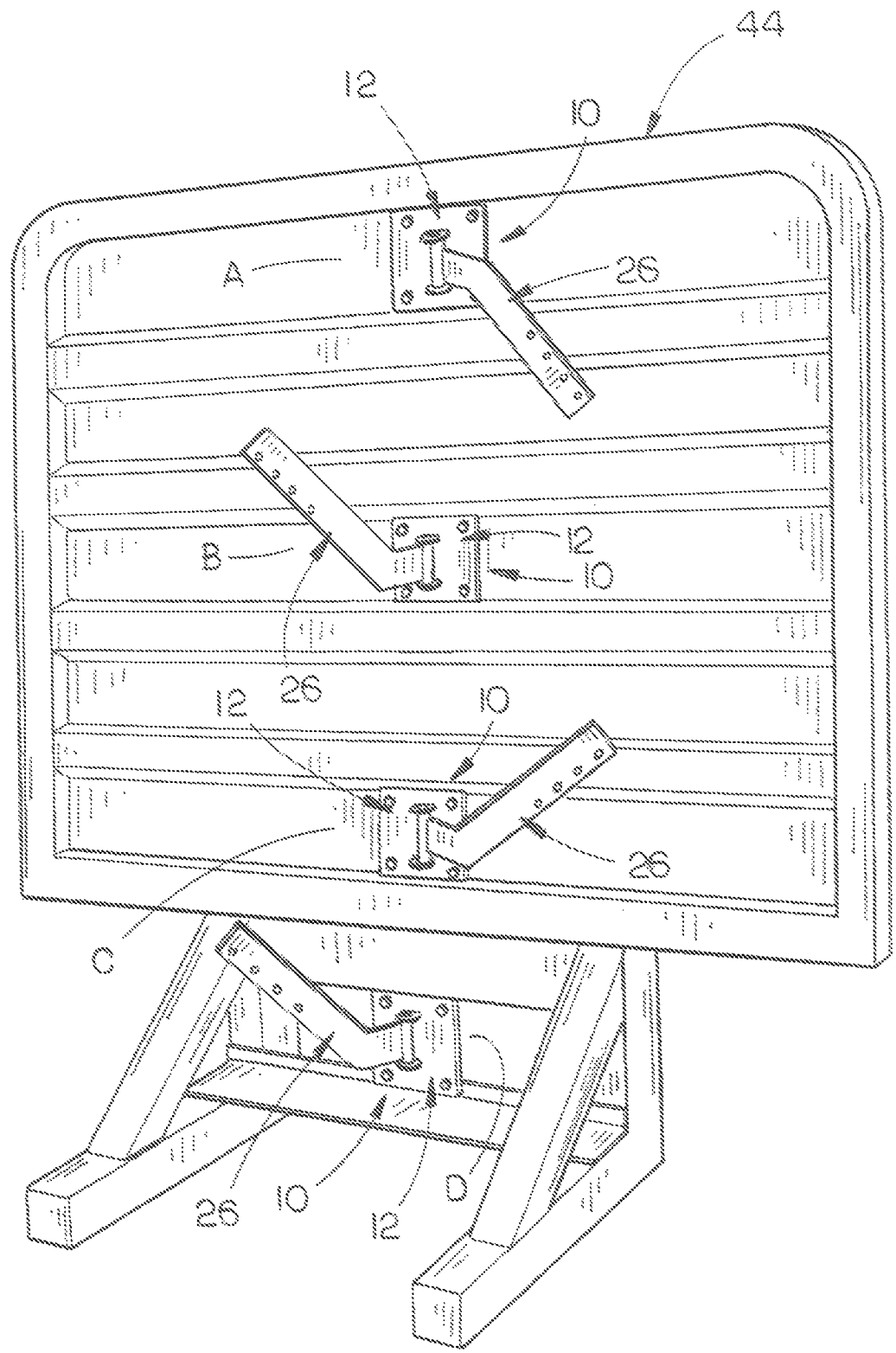
FIG. 5 is a rear perspective view of the headache rack illustrating the various positions that the hose support may be secured to the headache tack.

FIG. 5 illustrates the various mounting positions of the hose support 10 on the headache rack 44. If the hose support 10 is secured to the upper rearward side of the headache rack 44 in position A, the support arm 26 may extend rearwardly from mounting plate 12 and thence rearwardly and downwardly therefrom as illustrated in FIG. 5. The hose support 10 could also be mounted in position A so that the support arm of the hose support extends rearwardly and thence upwardly and rearwardly from the mounting plate 12 as illustrated in FIG. 1.

The hose support 10 may also be secured to headache rack 44 at positions B, C or D in FIG. 5. In position B, the support arm 26 may extend rearwardly and thence upwardly and rearwardly from mounting plate 12 or may extend rearwardly and thence rearwardly and downwardly from mounting plate 12. In the C position of FIG. 5, the support arm may extend rearwardly and thence upwardly and rearwardly as illustrated in FIG. 5 or may extend rearwardly and thence rearwardly and downwardly from mounting plate 12. In the position D of FIG. 5, the support arm will normally extend rearwardly from mounting plate 12 and thence upwardly and rearwardly.

If a headache rack 44 is not present, the mounting plate 12 may be secured to the rearward side of the cab 46 or some frame portion of the tractor 40.

Thus it can be seen that a novel hose support 10 has been provided which may be secured to the headache rack 44 of the tractor 40 with the support arm 26 thereof extending rearwardly and upwardly or rearwardly and downwardly from the mounting plate 12. The support arm 26 pivots about the mounting plate 12 to properly support the hoses and/or cables and so that the support arm 26 may swing from side to side about the pivot pin 20 as the tractor turns with respect to the trailer. The adjustment openings 32 in the rearward end of the support arm 26 enable the upper end of the spring 34 to be adjustably secured to the support arm 26 to enable the hoses 36 to be raised or lowered with respect to the hose support 10.

Thus it can be seen that the hose support of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:
   a tractor including a cab having a forward end and a rearward end;
   an upstanding headache rack positioned on said tractor rearwardly of said cab;
   said headache rack having a forward side and a rearward side;
   a trailer operatively coupled to said tractor rearwardly of said rearward side of said headache rack;
   a hose, having forward and rearward ends, extending between said tractor and said trailer;
   a substantially vertically disposed mounting plate secured to said rearward side of said headache rack;
   an elongated hose support arm having forward and rearward ends;
   said forward end of said hose support arm being pivotally secured, about a vertical axis, to said mounting plate;
   said hose support arm extending rearwardly and upwardly from said mounting plate;
   said hose being secured, intermediate said forward and rearward ends thereof, to said rearward end of said hose support arm.

2. The combination of claim 1 wherein said hose support arm extends rearwardly from said mounting plate and thence upwardly and rearwardly.

3. In combination:
   a tractor including a cab having a forward end and a rearward end;
   an upstanding headache rack positioned on said tractor rearwardly of said cab;
   said headache rack having a forward side and a rearward side;
   a trailer operatively coupled to said tractor rearwardly of said rearward side of said headache rack;
   a hose, having forward and rearward ends, extending between said tractor and said trailer;
   a substantially vertically disposed mounting plate secured to said rearward side of said headache rack;
   an elongated hose support arm having forward and rearward ends;
   said forward end of said hose support arm being pivotally secured, about a vertical axis, to said mounting plate;
   said hose support arm extending rearwardly and downwardly from said mounting plate;
   said hose being secured, intermediate said forward and rearward ends thereof, to said rearward end of said hose support arm.

4. The combination of claim 3 wherein said hose support arm extends rearwardly from said mounting plate and thence rearwardly and downwardly.

5. In combination:
   a trailer including a cab having a forward end and a rearward end;
   a tractor operatively coupled to said tractor rearwardly of said cab;
   a plurality of hoses, having forward and rearward ends, extending between said tractor and said trailer;
   a substantially vertically disposed mounting plate secured to said rearward side of said cab;
   an elongated hose support arm having forward and rearward ends;
   said forward end of said hose support arm being pivotally secured, about a vertical axis, to said mounting plate;
   said hose support arm extending rearwardly from said mounting plate;
   said hoses being secured, intermediate said forward and rearward ends thereof, to said rearward end of said hose support arm.

6. The combination of claim 5 wherein said hose support arm extends rearwardly from said mounting plate and thence rearwardly and upwardly.

7. The combination of claim 5 wherein said hose support arm extends rearwardly from said mounting plate and thence rearwardly and downwardly.

8. The combination of claim 1 wherein an elongated spring interconnects said rearward end of said hose support arm and said hose.

9. The combination of claim 3 wherein an elongated spring interconnects said rearward end of said hose support arm and said hose.

10. The combination of claim 5 wherein an elongated spring interconnects said rearward end of said hose support arm and said hoses.

11. The combination of claim 8 wherein said spring is selectively adjustably secured to said hose support arm.

12. The combination of claim 9 wherein said spring is selectively adjustably secured to said hose support arm.

13. The combination of claim 10 wherein said spring is selectively adjustably secured to said hose support arm.

\* \* \* \* \*